(12) United States Patent
Tatsumi et al.

(10) Patent No.: US 6,404,583 B1
(45) Date of Patent: Jun. 11, 2002

(54) MAGNETIC TAPE RECORDING/REPRODUCING APPARATUS

(75) Inventors: Naoki Tatsumi, Atsugi; Kazuya Tamura, Isehara; Masahiro Harima, Atsugi, all of (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/475,524

(22) Filed: Dec. 30, 1999

(30) Foreign Application Priority Data

Jan. 18, 1999 (JP) .......................................... 11-009770

(51) Int. Cl.7 .......................................... G11B 15/665

(52) U.S. Cl. ................................................. 360/85

(58) Field of Search .............................. 360/84, 85, 95, 360/137, 130.21, 130.22, 130.23

(56) References Cited

U.S. PATENT DOCUMENTS 4,975,793 A * 12/1990 Oka .............................. 360/85
5,930,070 A * 7/1999 Tanabe et al. ................. 360/85

FOREIGN PATENT DOCUMENTS

| JP | 54-106211 | * | 8/1979 |
| JP | 59-92468 | * | 5/1984 |
| JP | 59-113567 | * | 6/1984 |
| JP | 60-52948 | * | 3/1985 |
| JP | 61-66256 | * | 4/1986 |
| JP | 62-38553 | * | 2/1987 |
| JP | 62-248157 | * | 10/1987 |

* cited by examiner

Primary Examiner—William Klimowicz
(74) Attorney, Agent, or Firm—Ladas & Parry

(57) ABSTRACT

A magnetic tape recording/reproducing apparatus has a tape loading mechanism which performs a tape loading operation by moving a post from an original position to a loading position so as to extract a magnetic tape from a loaded cassette and a tape unloading operation to return the magnetic tape to within the cassette, the tape loading mechanism comprising a spring member, the spring member being disposed so as to deform during the tape unloading operation, the tape unloading operation terminating after the spring member deforms, the deformed spring member urging the post to return to the original position. The tape unloading operation terminates after the cam plate returns to an original position and the drive cam plate moves relative to the cam plate while the spring member deforms. Hence, the post is urged by the spring and securely returns to its original position.

4 Claims, 7 Drawing Sheets

MAGNETIC TAPE RECORDING/REPRODUCING APPARATUS

BACKGROUND OF THE INVENTION

1. Field of the Invention

The present invention relates generally to a magnetic tape recording and/or reproducing apparatus (hereinafter referred to as a magnetic tape recording/reproducing apparatus), and more particularly, to a digital audio tape recorder (hereinafter "DAT") streamer used as a large-capacity external memory back-up device for computers.

2. Description of the Related Art

The DAT streamer uses a DAT tape cassette. The DAT tape cassette is loaded in the DAT streamer, a magnetic tape is extracted from the DAT tape cassette by tape guide posts in a tape loading operation and thereafter the magnetic tape is driven between a capstan and a pinch roller. Recording information to and reproducing information from the magnetic tape is carried out by a high-speed rotary drum, that is, a rotary head. After recording and reproduction is completed, the magnetic tape is returned to the DAT tape cassette in a tape unloading operation, after which the DAT tape cassette may be ejected.

In order for the DAT tape cassette to be ejected smoothly, it is important that the tape guide posts having flanges at a top and a bottom thereof be securely returned to their original positions at the stage at which the tape unloading operation is completed. If the tape guide posts are not returned to their original positions, then when the DAT tape cassette is ejected a lengthwise edge of the magnetic tape may contact an upper flange of the top of the tape guide posts, thus damaging the magnetic tape.

In order to facilitate an understanding of the problem, a description will now be given of the related art.

The conventional DAT streamer tape loading mechanism has a motor, a cam gear, a cam plate, a cam plate arm, and tape guide posts. When the DAT tape cassette is loaded, the motor rotates the cam gear. The rotation of the cam gear is transmitted to the cam plate via the cam plate arm, the cam plate moves, the tape guide posts move in a direction away from the DAT tape cassette and the operation of loading the tape by pulling the magnetic tape out from the DAT tape cassette is performed. When recording and reproduction are stopped, the motor again rotates the cam gear, the rotation of the cam gear is transmitted to the cam plate via the cam plate arm, the cam plate moves so as to move the tape guide posts in a direction so as to return to the DAT tape cassette and the magnetic tape is returned to within the DAT tape cassette in a tape unloading operation.

Among those parts related to the tape guide posts is a spring for pressing the tape guide posts against a stopper near the rotary drum. In the tape loading operation described above, the operation terminates in a state in which the spring is stretched and the tape guide posts are pressed against the stopper due to the spring force of the stretched spring, and there is no problem.

In the tape unloading operation, however, there is no pressing of the tape guide posts against the stopper, so the position of the tape guide posts when the tape unloading operation terminates is dependent upon the accumulation of dimensional tolerances of the various parts that comprise the tape loading mechanism and the precision with which the DAT streamer has been assembled, and hence varies with each assembled DAT streamer. Normally such variation does not present a problem. On occasion, however, the tape guide posts end their travel at a position relatively far from their proper final position, and when the DAT tape cassette is ejected in such cases there is a possibility that the lengthwise edge of the magnetic tape hits the top flanges of the guide posts, thus damaging the magnetic tape.

In actuality, in those cases in which the tape guide posts do not fully return to their original positions the positions at which the parts are mounted are adjusted so as to permit the tape guide posts to return to their original positions. However, such adjustment is troublesome.

SUMMARY OF THE INVENTION

Accordingly, it is an object of the present invention to provide an improved and useful magnetic tape recording/reproducing apparatus in which the disadvantages described above are eliminated.

Another and more specific object of the present invention is to provide a magnetic tape recording/reproducing apparatus in which a spring urges the tape guide posts back to their original positions.

The above-described objects of the present invention are achieved by a magnetic tape recording/reproducing apparatus comprising:

a tape loading mechanism which performs a tape loading operation by moving a post from an original position to a loading position so as to extract a magnetic tape from a loaded cassette and a tape unloading operation to return the magnetic tape to within the cassette, the tape loading mechanism comprising a spring member, the spring member being disposed so as to deform during the tape unloading operation, the tape unloading operation terminating after the spring member deforms, the deformed spring member urging the post to return to the original position thereof.

According to the invention described above, regardless of the cumulative tolerance that is the accumulation of the tolerances of the individual parts that together form the tape loading mechanism and regardless of the lack of precision with which the magnetic tape recording/reproducing apparatus is assembled, the loading posts 12, 13 can be urged by the spring member and reliably returned to their original positions in a state in which the tape loading mechanism terminates a tape unloading operation. Accordingly, the magnetic tape does not get caught on the loading posts either when one cassette is ejected or when another cassette is loaded into the apparatus. Additionally, it is possible to do without the adjusting mechanism for slightly shifting the installation positions of the parts so that the loading posts return to their original positions, such adjusting mechanism required conventionally whenever the loading posts do not fully return to those original positions.

Additionally, the above-described objects of the present invention are also achieved by a magnetic tape recording/reproducing apparatus comprising:

a tape loading mechanism which performs a tape loading operation by moving a post from an original position to a loading position so as to extract a magnetic tape from a loaded cassette and a tape unloading operation to return the magnetic tape to within the cassette, the tape loading mechanism comprising:

a cam plate that moves in a first direction from an original position so as to cause the post to extract the magnetic tape from the loaded cassette, the cam plate moving in a second direction opposite to the first direction to the original position thereof and moving the post to the original position thereof so as to cause the post to return the magnetic tape to within the cassette;

a drive cam plate mounted on the cam plate so as to be slidably movable within a predetermined range in the first direction and the second direction, a force for moving the cam plate acting on the drive cam plate; and a spring member disposed between the cam plate and the drive cam plate, the tape unloading operation terminating after the cam plate returns to the original position thereof and the drive cam plate moves relative to the cam plate while the spring member is deformed, the deformed spring member urging the post to return to the original position thereof.

According to the invention described above, a simple structure for urging the loading posts back to their original positions can be achieved, comprising a cam plate, drive cam plate and spring member.

Other objects, features and advantages of the present invention will become more apparent from the following detailed description when read in conjunction with the accompanying drawings.

DESCRIPTION OF THE PREFERRED EMBODIMENT

A description will now be given of an embodiment of the present invention, with reference to the accompanying drawings.

For ease of explanation, a summary description will first be given of a tape loading operation and a tape unloading operation of an embodiment of a DAT streamer 10 according to the present invention, with reference to FIG. 3.

Figure 3:
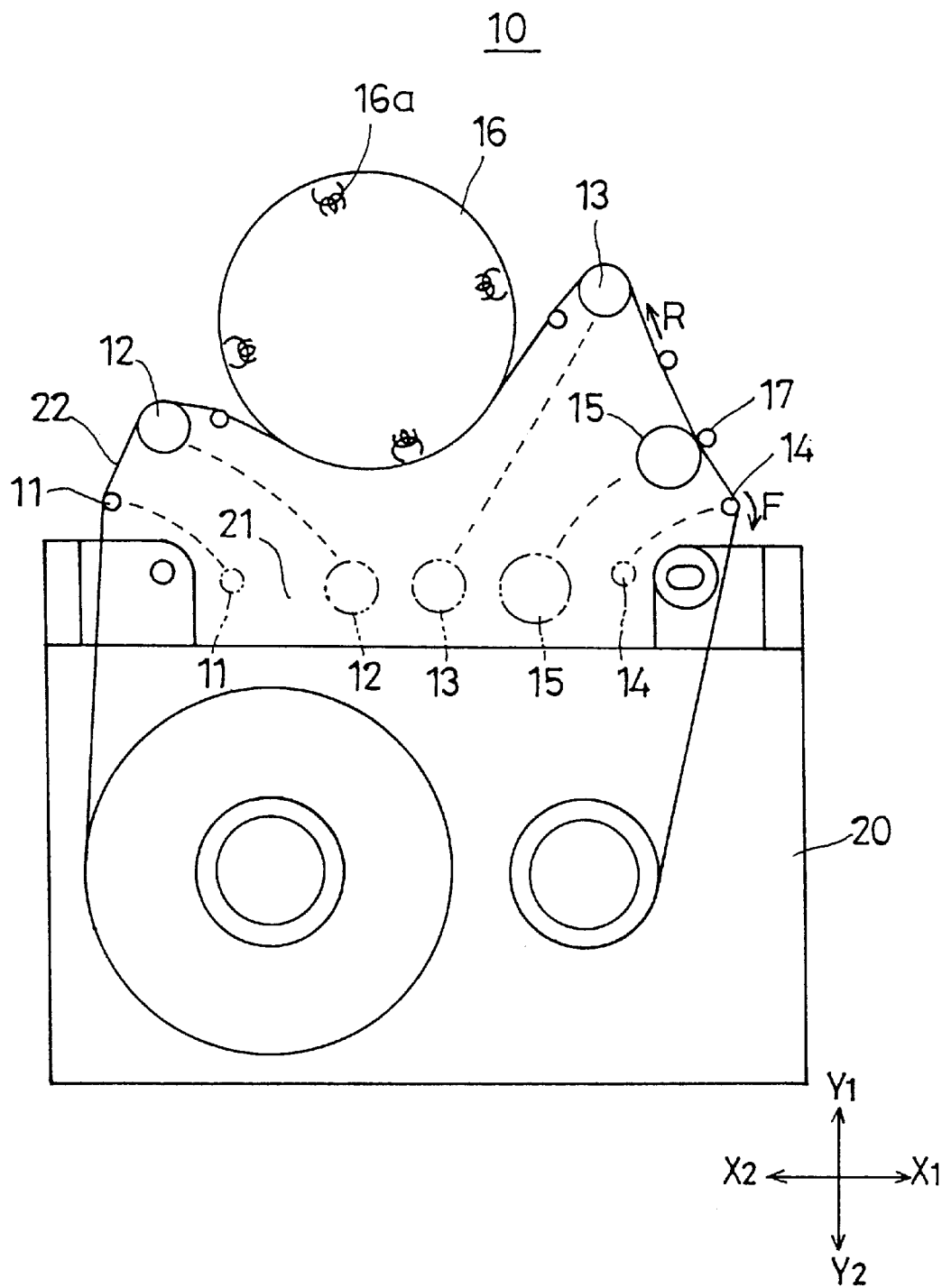
FIG. 3 is a schematic diagram of a tape loading operation and a tape unloading operation of an embodiment of a DAT streamer according to the present invention.
Figure 4:
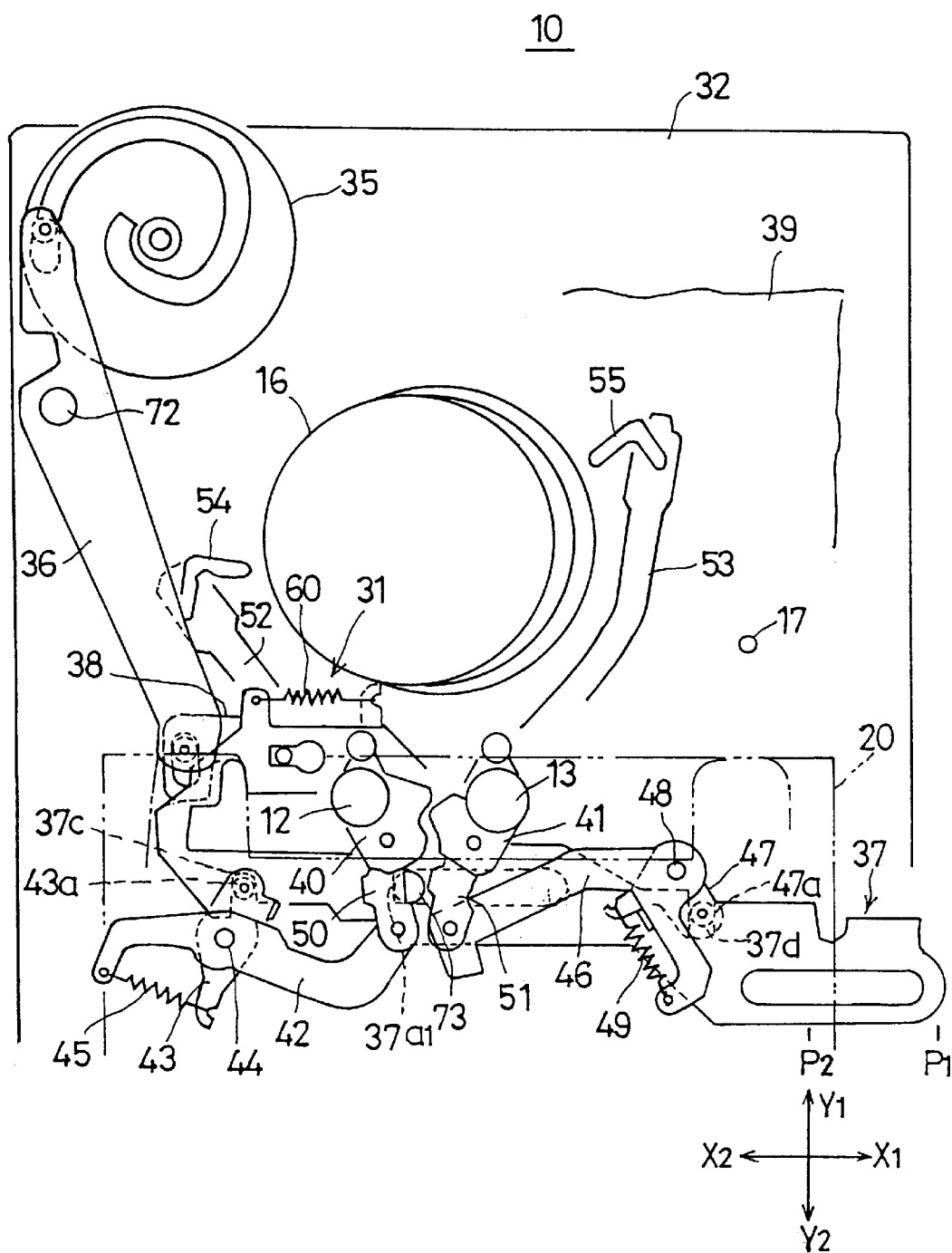
FIG. 4 shows a state in which the tape unloading operation of an embodiment of a DAT streamer according to the present invention has been completed.

Prior to the loading of the DAT tape cassette 20, the supply reel tape guide post 11, loading posts 12, 13, take-up reel tape guide post 14 and pinch roller 15 are located at positions indicated by the two-dot chain line lines in FIG. 3. These positions are also the same positions as when a tape unloading operation is completed, and correspond to the position of a concavity 21 of a front side of the loaded DAT tape cassette 20 as can be seen in FIG. 4. The loading posts 12, 13 have flanges at a top and a bottom thereof.

Figure 5:
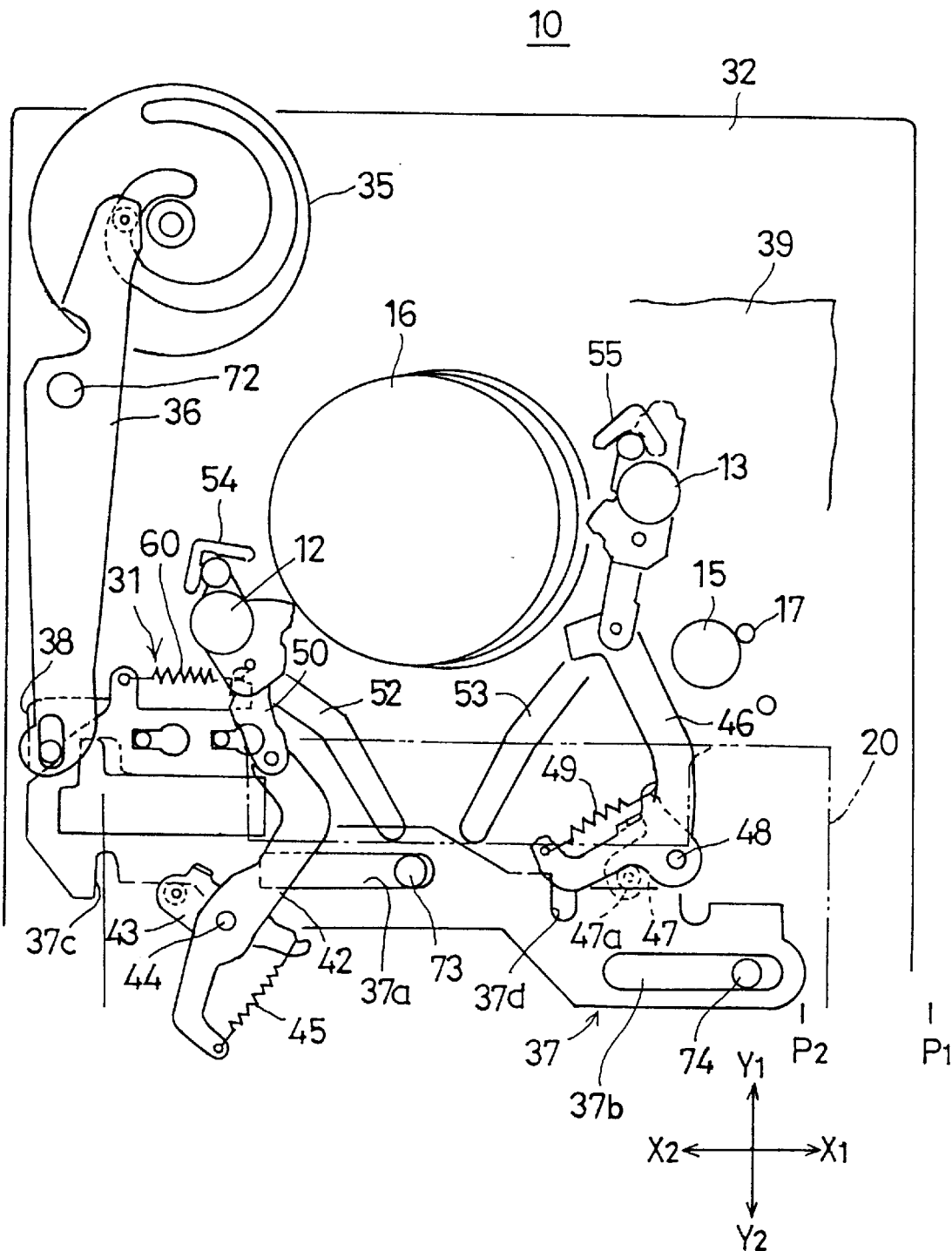
FIG. 5 shows a state in which the tape loading operation of an embodiment of a DAT streamer according to the present invention has been completed.

The DAT tape cassette 20 is loaded into the apparatus by first being moved horizontally and then being dropped downward, with the supply reel tape guide post 11, the loading posts 12, 13 the take-up reel tape guide post 14 and the pinch roller 15 positioned inside the concavity 21. Once the DAT tape cassette 20 is loaded the tape loading operation commences, the tape guide post 11, the loading posts 12, 13, the tape guide post 14 and pinch roller 15, respectively, each move along the paths indicated by the dotted lines to the positions shown in FIG. 3, magnetic tape 22 is extracted from the loaded DAT tape cassette 20 by the loading posts 12, 13, the supply reel tape guide post 11, the take-up reel tape guide post 14 and wound around the rotary drum 16 having a rotary head 16a such that the magnetic tape 22 forms a predetermined tape path, with the pinch roller 15 pressed against the rotating capstan 17 as shown in FIG. 5.

Next, the magnetic tape 22 is sandwiched between and driven by the pinch roller 15 and the capstan 17, guided by the tape guide post 11, the loading posts 12, 13 and the tape guide post 14 and driven in a forward direction indicated by an arrow F. Information is either recorded to the magnetic tape 22 by the rotary head 16a or the rotary head 16a reproduces information recorded on the magnetic tape 22. When the capstan motor reverses and the capstan 17 is rotated in a counter-clockwise direction, the magnetic tape 22 is run slightly in a reverse direction indicated by an arrow R. The recording of information to the magnetic tape 22 is carried out while reproducing the recorded location to verify that recording has been carried out. Accordingly, the capstan 17 repeatedly rotates alternately in the counter-clockwise direction and the clockwise direction, thereby repeatedly running the magnetic tape 22 alternately in the forward direction and the reverse direction.

When the stop button is pressed and the recording of information and the reproducing of information are terminated the tape unloading operation begins, the tape guide post 11, loading posts 12, 13, tape guide post 14 and pinch roller 15, respectively, each move along the paths indicated by the dotted lines so as to move in a direction opposite to that described above and thereby return to within the DAT tape cassette 20, with the magnetic tape 22 being unwound and returned to within the DAT tape cassette 20. When the tape guide post 11, loading posts 12, 13, tape guide post 14 and pinch roller 15 return to their original positions as indicted by the two-dot chain line lines in FIG. 3, the tape unloading operation terminates. The DAT tape cassette 20 is then moved first upward and then outward, and automatically ejected.

Next, a description will be given of a tape loading mechanism 30.

Figure 1:
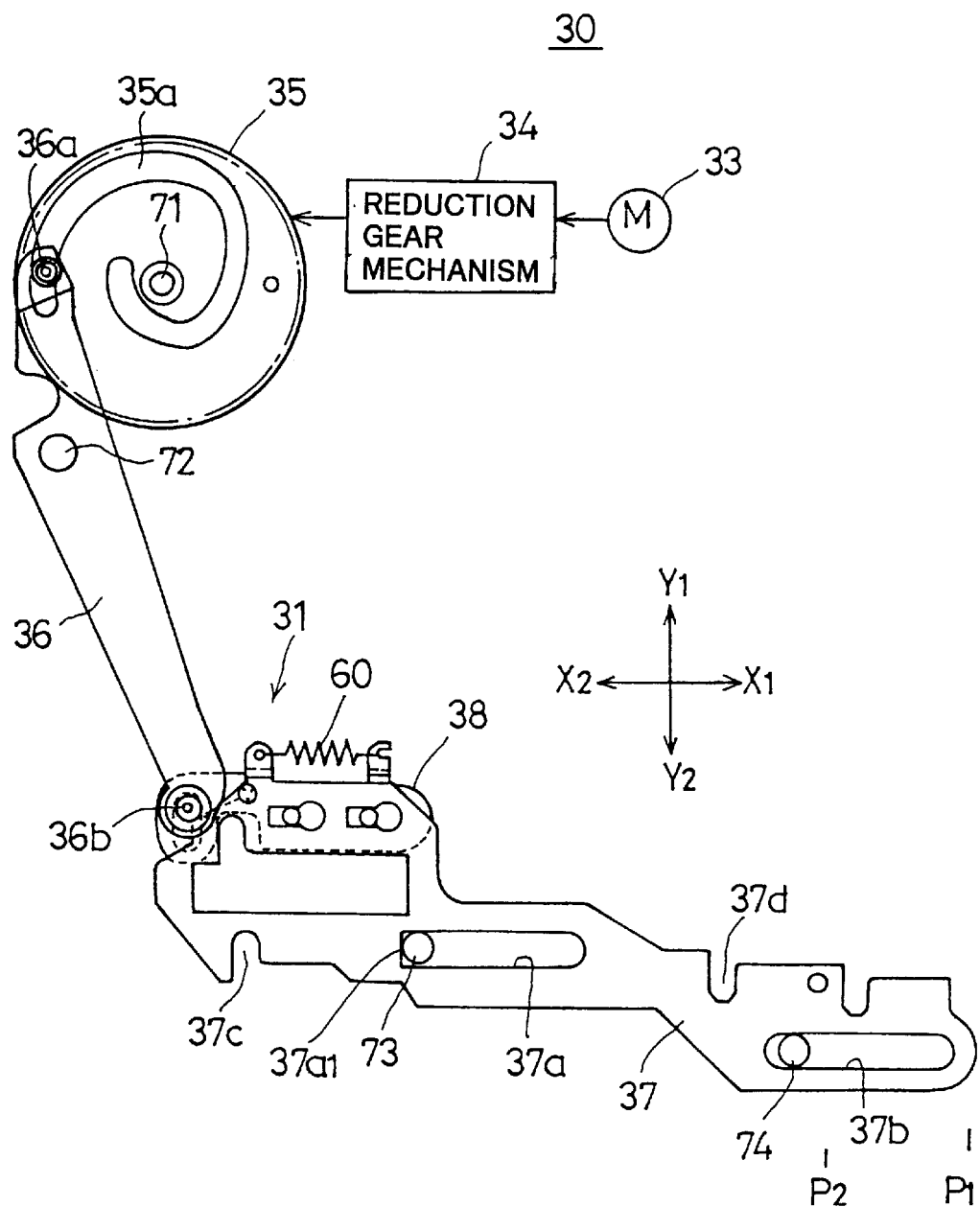
FIG. 1 is a diagram showing a tape unloading state of a tape loading mechanism of an embodiment of a DAT streamer according to the present invention.

FIGS. 1 and 4 show a state after the termination of a tape unloading operation. FIG. 5 shows a state after the termination of a tape loading operation.

The tape loading mechanism 30 has an overstroke mechanism 31 that functions during a tape unloading operation, and more specifically, that functions during the final stage of a tape unloading operation.

The tape loading mechanism 30 is mounted on a top surface of a chassis 32 of the DAT streamer 10 and has a motor 33, a reduction gear mechanism 34, a cam gear 35, a cam plate arm 36, a cam plate 37, a drive cam plate 38, loading posts 12, 13 and an overstroke mechanism 31. For ease of explanation a description of the overstroke mechanism 31 will be deferred until later.

The cam gear 35 has a cam groove 35a and is supported by a shaft 71 mounted on the chassis 32. The cam plate arm 36 has a pin 36a at one end and a pin 36b at the other end, and is supported by a shaft 72 on the chassis 32 with the pin 36a engaging the cam groove 35a. The pin 36b is indirectly connected to the cam plate 37. For ease of explanation a description of this part will be deferred until later.

The cam plate 37 has slots 37a, 37b which engage pins 73, 74 so that the cam plate 37 is slidably movable in a lateral direction indicated by arrows X1-X2 in for example FIG. 1. The pin 73 functions as a stopper, receiving an X2-side edge 37a1 of the slot 37a so as to determine a slide position P1 of the cam plate 37 in an X1-direction slide position. The cam plate 37 is related to the tape guide post 11, loading posts 12, 13, tape guide post 14 and pinch roller 15. When the cam plate 37 slides in the X2 direction from the P1 position to a P2 position, the cam plate 37 causes the tape guide post 11, loading posts 12, 13, tape guide post 14 and pinch roller 15 to move from positions shown by two-dot chain line lines in FIG. 3 to positions shown by solid lines in FIG. 3. Conversely, when the cam plate 37 slides in the X1 direction from position P2 to position P1, the cam plate 37 causes the tape guide post 11, loading posts 12, 13, tape guide post 14 and pinch roller 15 to move from positions shown by solid lines in FIG. 3 to positions shown by two-dot chain line lines in FIG. 3. For convenience of illustration, FIG. 4 and FIG. 5 show only the loading posts 12, 13.

The loading posts 12, 13 and the component parts related to the loading posts 12, 13 are mounted on a sub-chassis 39 itself mounted on a top side of the chassis 32. The loading posts 12, 13 are themselves mounted on respective bases 40, 41. Arms 42, 43 are supported by a pin 44 on a bottom surface of the sub-chassis 39. A spring 45 is disposed between the arms 42, 43 and the arms 42, 43 usually rotate as a single assembly. Similarly, arms 46, 47 are supported by a pin 48 on a bottom surface of the sub-chassis 39, with a spring 49 disposed between the arms 46, 47 such that the arms 46, 47 usually rotate as a single assembly. The arm 42 and the base 40 are coupled by a link 50 and the arm 46 and the base 41 are coupled by a link 51. A roller 43a on the arm 43 engages a concavity 37c of the cam plate 37 and a roller 47a on the arm 47 engages a concavity 37d of the cam plate 37.

The tape loading operation commences from the state shown in FIG. 1 and FIG. 4. When the motor 33 starts and rotates forward, the cam gear 35 is rotated counter-clockwise via the reduction gear mechanism 34 and the cam plate arm 36 is rotated clockwise, the cam plate 37 is slid in the X2 direction, the arm 42 is rotated counter-clockwise and the arm 46 is rotated clockwise and the bases 40, 41 are moved along guide grooves 52, 53 in the sub-chassis 39. When the cam plate 37 reaches a final stage at position P2, then, as shown in FIG. 5, the springs 45, 49 are stretched, the bases 40, 41 are pressed against stoppers 54, 55 on top of the sub-chassis 39 and the tape loading operation terminates. The loading posts 12, 13 are fixedly positioned on either side of the rotary drum 16.

The tape unloading operation commences from the state shown in FIG. 5. When the motor 33 starts and rotates in reverse, the cam gear 35 is rotated clockwise via the reduction gear mechanism 34 and the cam plate arm 36 is rotated counter-clockwise, the cam plate 37 is slid in the X1 direction, the arm 42 is rotated clockwise and the arm 46 is rotated counter-clockwise and the bases 40, 41 are moved along guide grooves 52, 53 in the sub-chassis 39 to their original positions, where the tape unloading operation terminates.

Next, a description will be given of the overstroke mechanism 31.

Figure 2:
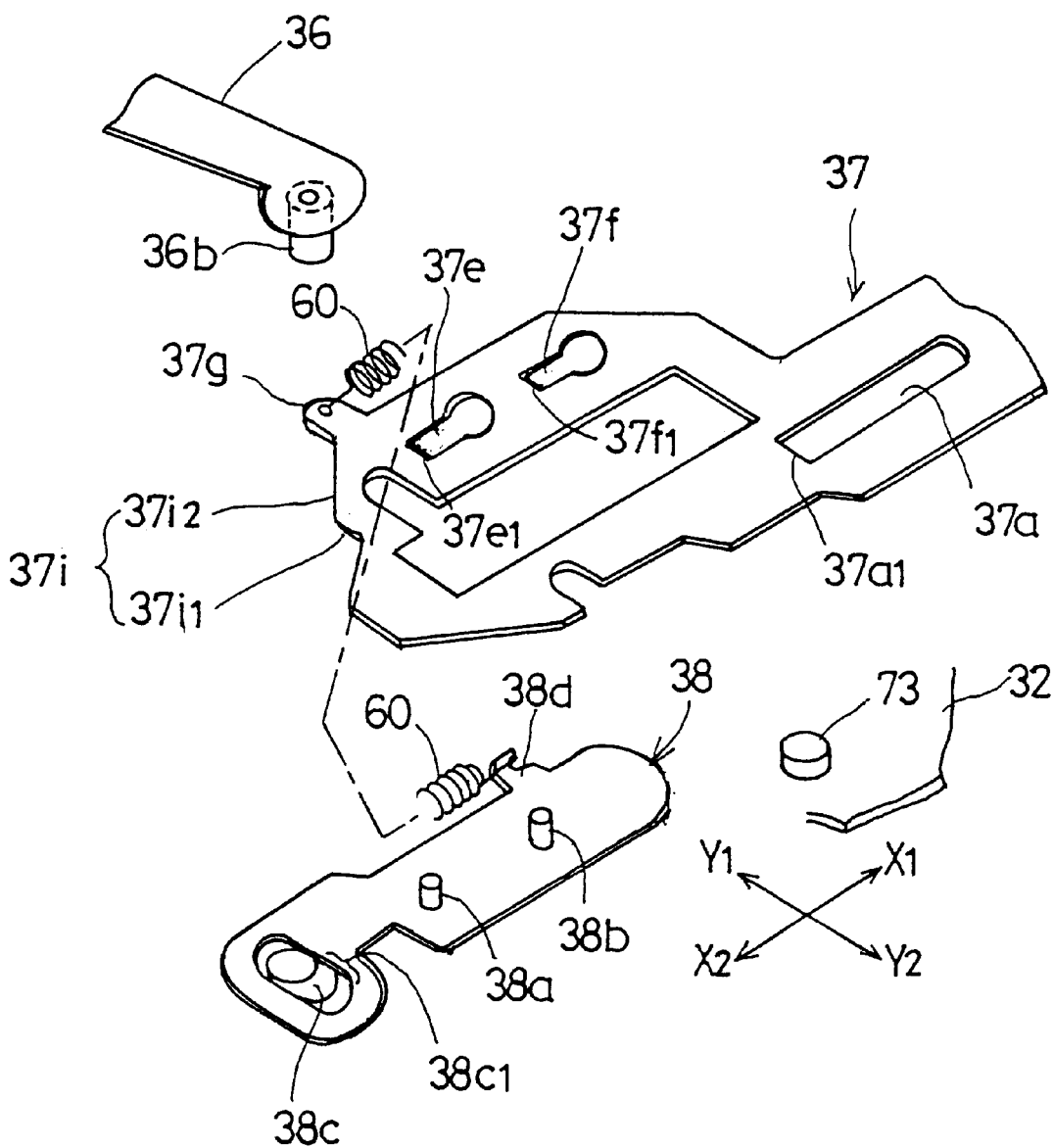
FIG. 2 is an exploded view of an overstroke mechanism of the tape loading mechanism of FIG. 1.

As shown in FIG. 1 and FIG. 2, the overstroke mechanism 31 is configured so that the drive cam plate 38 is mounted on cam plate 37, with a tension coil spring 60 stretched between the cam plate 37 and the drive cam plate 38.

As shown in FIG. 2, the drive cam plate 38 has pins 38a, 38b and a slot 38c at an X2-side end, the slot 38c being elongated in a Y1-Y2 direction. An extension 38d for a spring is provided at an X1-side end of the drive cam plate 38. Reference numeral 38c1 is an edge portion of the slot 38c on the X1 side of the slot 38c, of a length equal to half the length of the slot in the Y1-Y2 direction.

The cam plate 37 has slots 37e, 37f extending in the X1-X2 direction and expanded in a Y1 direction on an X2-Y1 side portion of the cam plate 37, an extension 37g for retaining a spring and an edge 37i. The edge 37i has a receiving edge portion 37i1 extending in the Y1-Y2 direction and a retreating edge portion 37i2 extending from a Y1 side of the receiving edge portion 37i1 in a direction midway between the Y1 direction and the X1 direction.

The pins 38a, 38b respectively engage slots 37e, 37f and, further, tension coil spring 60 is strung between extension 37g and extension 38d so as to mount the drive cam plate 38 on the cam plate 37. The drive cam plate 38 is urged by the force of the tension coil spring 60 so as to slide in the X2 direction relative to the cam plate 37, with the force of the tension coil spring 60 urging the pins 38a, 38b against the edges 37e1, 37f1 of the slots 37e, 37f. Accordingly, the drive cam plate 38 and the cam plate 37 act completely as a single assembly in the X2 direction and act elastically as a single assembly in the X1 direction. That is, when the load against the slide of the cam plate 37 in the X1 direction is smaller than the force of the tension coil spring 60, the cam plate 37 slides together with the drive cam plate 38 as a single unit. When the load exceeds the force of the tension coil spring 60, then the tension coil spring 60 is stretched and the drive cam plate 38 slides in the X1 direction relative to the cam plate 37.

During a tape loading operation, the cam plate arm 36 is rotated in a clockwise direction, the drive cam plate 38 is pulled in the X2 direction, the pins 38a, 38b press against the edges 37e1, 37f1 of the slots 37e, 37f and the cam plate 37 and the drive cam plate 38 are slid in the X2 direction as a single unit.

During a tape unloading operation, the cam plate arm 36 is rotated counter-clockwise from the state shown in FIG. 5 to the state shown in FIG. 4 and FIG. 1. When the cam plate arm 36 is rotated counter-clockwise, the pin 36b pushes the drive cam plate 38 in the X1 direction and this force is transmitted to the cam plate 37 via the tension coil spring 60 and the cam plate 37 is slid in the X1 direction.

Here, the cam plate arm 36 and the cam plate 37 and the pin 73 are constructed so that, at a stage at which the cam plate arm 36 is rotated to a position just slightly prior to the position shown in FIG. 4 and FIG. 1, the cam plate 37 is returned to a position P1 and the X2-edge 37a1 of the slot 37a contacts the pin 73.

Accordingly, when the cam plate arm 36 is rotated to a position just slightly prior to the position shown in FIG. 4 and FIG. 1, the X2 edge 37a1 of the slot 37a contacts the pin 73 and the cam plate 37 is returned to position P1.

The cam plate arm 36 continues to rotate until reaching the position shown in FIG. 4 and FIG. 1. This rotation is an overstroke. In the final stage of rotation, the drive cam plate 38 slides in the X1 direction relative to the cam plate arm 36 while further stretching the tension coil spring 60 as shown in FIG. 9, absorbing the overstroke of the cam plate arm 36.

Figure 9:
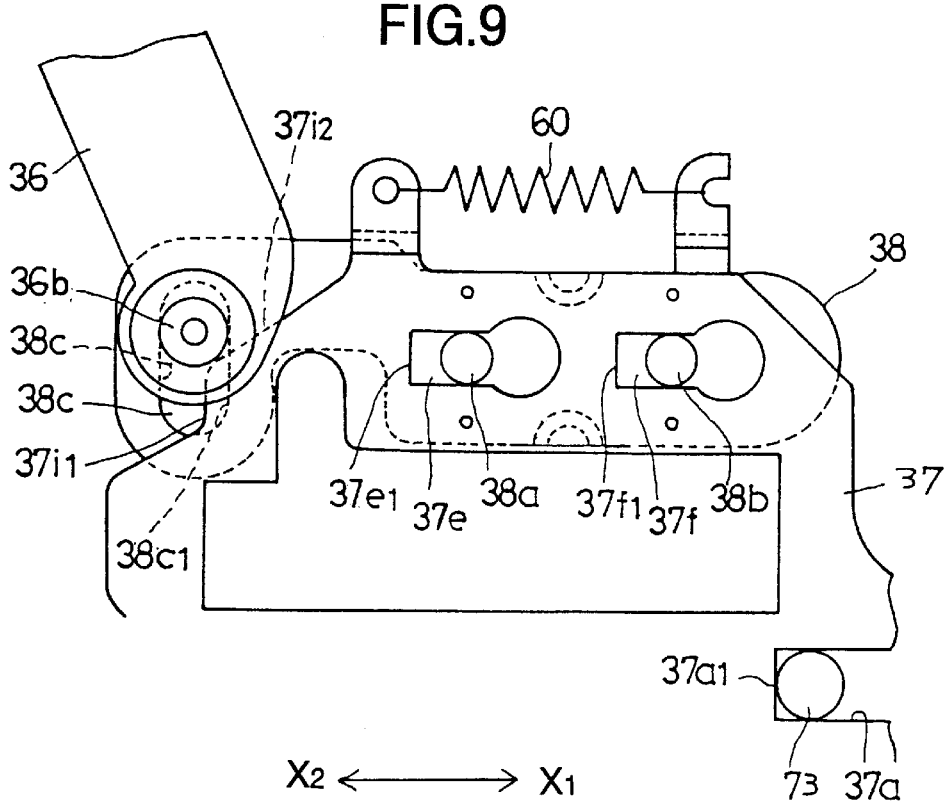
FIG. 9 shows a state of the overstroke mechanism upon completion of a tape unloading operation.

Additionally, when the drive cam plate 38 slides in the X1 direction relative to the cam plate 37, then, as shown in FIG. 9, pins 38a, 38b separate from edges 37e1, 37f1 of slots 37e, 37f and the force of the tension coil spring 60 acts to slide the cam plate 37 in the X1 direction. Accordingly, the cam plate 37 is reliably returned to and held at position P1 by the force of the tension coil spring 60 pressing the X2 edge 37a1 of the slot 37a against the pin 73.

Accordingly, the loading posts 12, 13 are reliably returned to the positions shown in FIG. 4 regardless of the lack of precision with which the DAT streamer 10 is assembled, the level of cumulative tolerance of the individual parts which comprise the tape loading mechanism 30 or the variations in the precision with which the tape loading mechanism 30 is assembled. As a result, the DAT tape cassette 20 is ejected without either the top flanges of the loading posts 12, 13 or the other posts interfering with the lengthwise edge of the magnetic tape 22 and hence without damage to the magnetic tape 22. Similarly, neither the loading posts 12, 13 nor the other posts interfere when a separate DAT tape cassette is loaded, and consequently there is no damage from the lengthwise edge of the magnetic tape hitting the loading posts 12, 13 when loading a DAT tape cassette. Additionally, the conventional adjustment mechanism is no longer required.

It should be noted that in the final stage of counter-clockwise rotation of the cam plate arm 36, the pin 36b is positioned toward the Y1 end of the slot 38 as shown in FIG. 9, so as to be disposed opposite to retreating edge portion 37i2 of edge 37i. Accordingly, when pin 36b moves along an arc centered about the shaft 72, the pin 36b moves without interference with the edge 37i of the cam plate 37 and the overstroke mechanism operates without hindrance.

Next, a description will be given of an operation of the above-described overstroke mechanism 31 in the final stage of rotation of the cam plate arm 36 from the state shown in FIG. 5 to a state just prior to the state shown in FIG. 4.

The overstroke mechanism 31 is configured so as to not operate at the above-described final stage of rotation of the cam plate arm 36.

Figure 6:
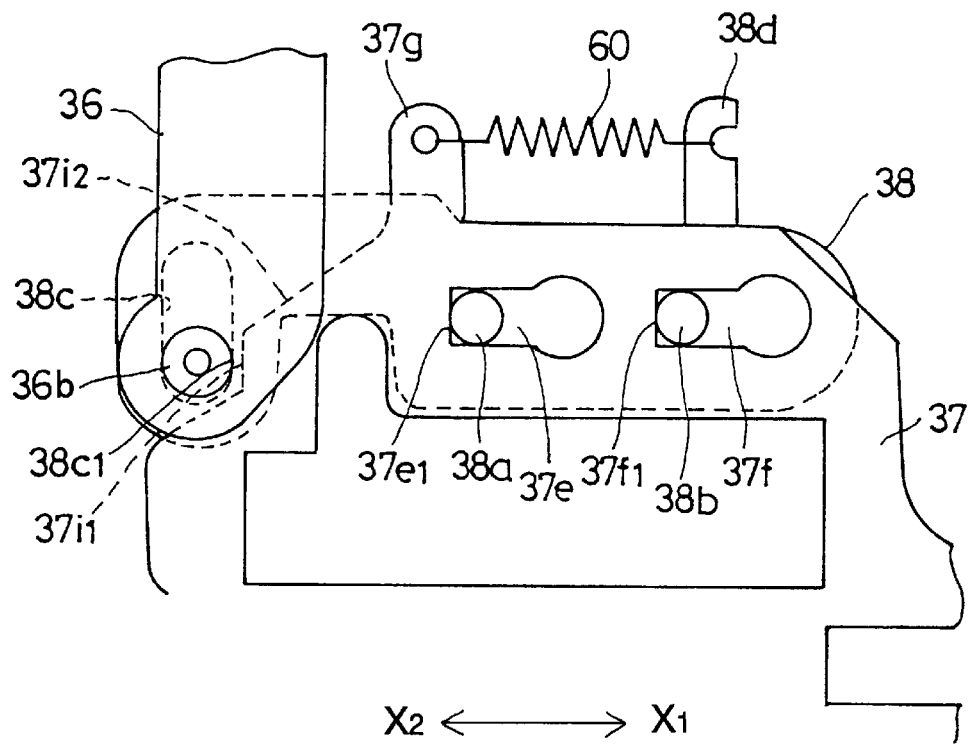
FIG. 6 shows a state of an overstroke mechanism of a state in which a tape loading operation has been completed (prior to the beginning of a tape unloading operation)

That is, when the cam plate arm 36 is in the state shown in FIG. 5, then, as shown together in FIG. 6, the edge 38c1 of the slot 38c substantially aligns with the receiving edge portion 37i1 and the retreating edge portion 37i2 is withdrawn in the X1 direction from the edge 38c1 of the slot 38c. Additionally, the cam plate arm 36 is in a rotation position that is substantially in the Y1-Y2 direction, with the pin 36b that moves along an arc centered on the shaft 72 positioned toward a Y2 side of the slot 38c. The relation between the pin 36b and the edge 37i is such that the pin 36b is positioned to oppose the receiving edge portion 37i1.

Figure 7:
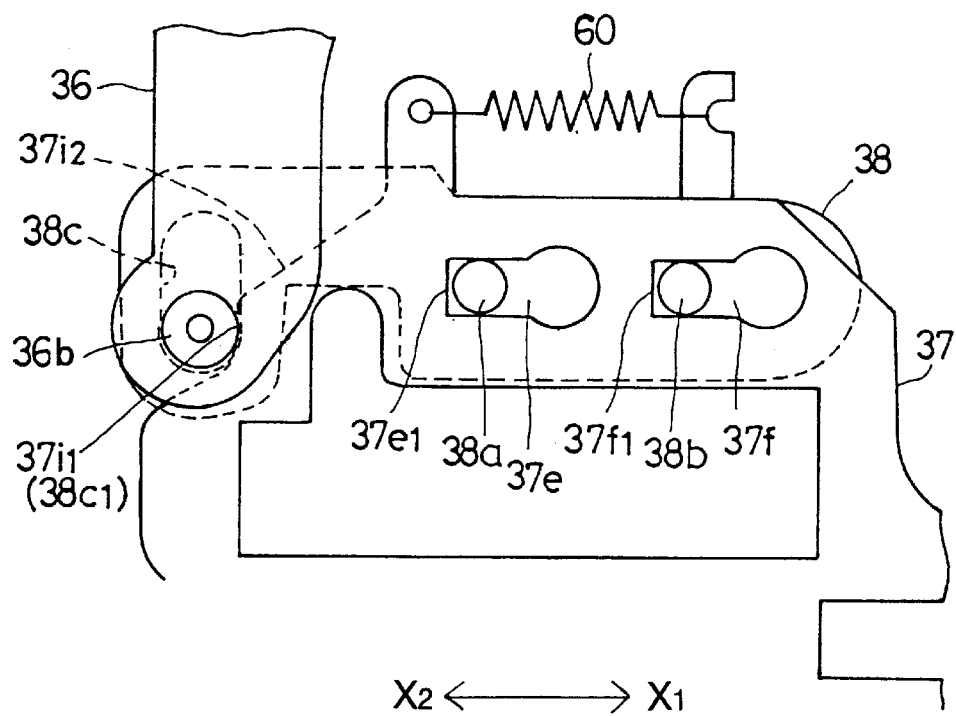
FIG. 7 shows a state of the overstroke mechanism just after the beginning of a tape unloading operation.

In the state in which the tape unloading operation is commenced as shown in FIG. 5, the rollers 43a, 47a are pressed against the cam plate 37 by the force of the stretched springs 45, 49 in a state in which the load that slides in the X1 direction of the cam plate 37 is large. Accordingly, when the cam plate arm 36 begins to rotate counter-clockwise and pin 36b begins to move in the X1 direction, the tension coil spring 60 is stretched and the drive cam plate 38 moves slightly in the X1 direction relative to the cam plate and, as shown in FIG. 7, pin 36b is put into a state of direct contact with the receiving edge portion 37i1 of the cam plate 37, the cam plate 37 is directly pressed by the pin 36b and begins to move in the X1 direction. Accordingly, even in a state in which the cam plate 37 load is large, the cam plate 37 begins to move reliably and smoothly in the X1 direction.

Figure 8:
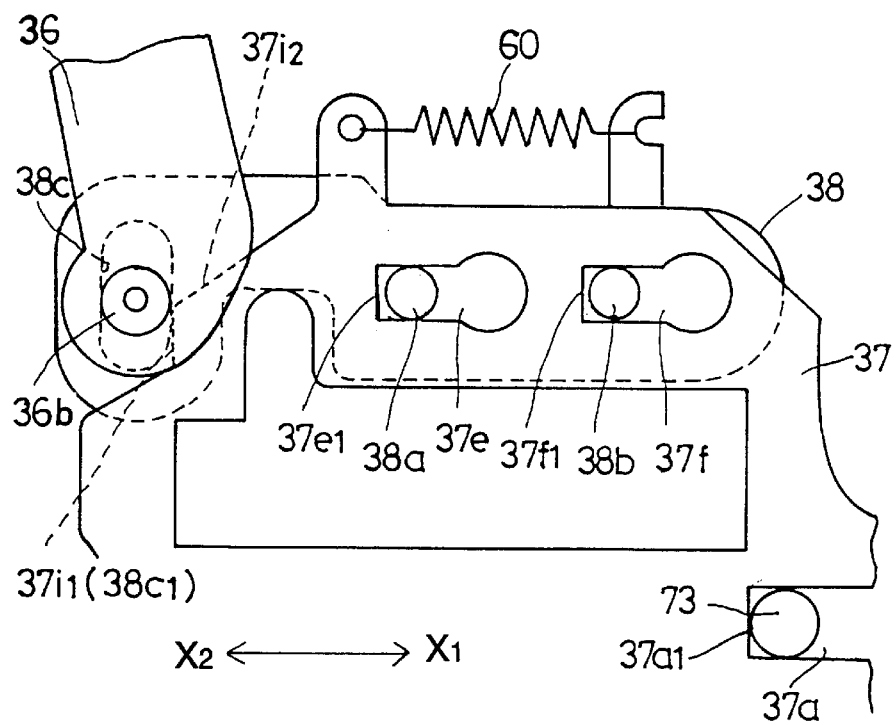
FIG. 8 shows a state of the overstroke mechanism at a final stage of a tape unloading operation.

As the cam plate 36 rotates counter-clockwise the pin 36b gradually moves toward the Y1 side of the slot 38c. When the cam plate arm 36 rotates to a state just prior to the state shown in FIG. 4, the pin 36b as shown in FIG. 8 is separated from the receiving edge portion 37i1 and at this stage the overstroke mechanism 31 is first enabled to operate.

During the rotation of the cam plate arm 36 to the state just prior to the state shown in FIG. 4, the pin 36b directly presses the receiving edge portion 37i1 of the cam plate 37, the force of the pin 36b is directly transmitted to the cam plate 37 and the cam plate 37 is moved in the X1 direction. Accordingly, even if, for example, the bases 40, 41 get stuck as they are being moved along the guide grooves 52, 53 in the sub-chassis 39 so as to return to their original positions, the cam plate 37 is directly pressed by the pin 36b and moved at substantially a constant speed. Accordingly, the bases do not move suddenly after temporarily stopping but instead move at substantially a constant speed. Accordingly, when the magnetic tape 22 is rewound and returned to within the DAT tape cassette 20, the magnetic tape 22 is neither subjected to strong tension nor does the magnetic tape 22 slacken. Instead, a substantially constant tension is maintained on the magnetic tape 22 and consequently the magnetic tape 22 is not damaged.

It should be noted that it is not necessary to provide the receiving edge portion 37i1 described above and limit the operation of the overstroke mechanism 31 if a spring having a large spring constant is used for the tension coil spring 60 described above. However, in doing so, when the tape unloading operation terminates the force with which the X2 edge 37a1 of the slot 37a presses against the pin 73 may become too large and thus affect the useful life of the DAT streamer 10, which is undesirable. The present embodiment provides the receiving edge portion 37i1 so as to limit the operation of the overstroke mechanism 31 and uses a tension coil spring 60 having a small spring constant. Accordingly, when the tape unloading operation terminates the force with which the X2 edge 37a1 of the slot 37a presses against pin 73 is small and does not affect the useful life of the DAT streamer 10.

Additionally, it is also possible to include within the cam plate arm 36 a mechanism achieving the same function as the overstroke mechanism 31.

Additionally, the present invention is not limited to the DAT streamer 10 but is applicable to an ordinary video tape recorder as well.

The above description is provided in order to enable any person skilled in the art to make and use the invention and sets forth the best mode contemplated by the inventors of carrying out the invention.

The present invention is not limited to the specifically disclosed embodiment, and variations and modifications may be made without departing from the scope of the present invention.

The present application is based on Japanese Priority Application No. 11-009770 filed on Jan. 18, 1999, the entire contents of which are hereby incorporated by reference.

What is claimed is:

1. A magnetic tape recording/reproducing apparatus comprising:
   a tape loading mechanism which performs a tape loading operation by moving a post from an original position to a loading position so as to extract a magnetic tape from a loaded cassette and a tape unloading operation to return the magnetic tape to within the cassette, the tape loading mechanism comprising:
- a cam plate that moves in a first direction from an original position so as to cause the post to extract the magnetic tape from the loaded cassette, the cam plate moving in a second direction opposite to the first direction to the original position thereof and moving the post to the original position thereof so as to cause the post to return the magnetic tape to within the cassette;
- a drive cam plate mounted on the cam plate so as to be slidably movable within a predetermined range in the first direction and the second direction, a force for moving the cam plate acting on the drive cam plate; and
- a spring member disposed between the cam plate and the drive cam plate,
- the tape unloading operation terminating after the cam plate returns to the original position thereof and the drive cam plate moves relative to the cam plate while the spring member is deformed, the deformed spring member urging the post to return to the original position thereof.

2. The magnetic tape recording/reproducing apparatus as claimed in claim 1, wherein a movement of the drive cam plate relative to the cam plate is restricted until the cam plate is moved in the second direction and returned to the original position thereof, the movement of the drive cam plate relative to the cam plate being enabled after the cam plate has been returned to the original position thereof.

3. The magnetic tape recording/reproducing apparatus as claimed in claim 1, further comprising a drive arm having a pin disposed on a distal edge thereof, the drive arm being rotated in one direction when the tape loading operation is performed and rotated in a direction that is the reverse of the first direction when the tape unloading operation is being performed, the pin moving along an arc, the pin engaging a slot of the drive cam plate, the cam plate having an edge, the edge being formed to a range such that the edge opposes the pin while the drive arm rotates to a prior position just before reaching a final position in the reverse direction and ceases to oppose the pin once the drive arm rotates so as to exceed the prior position, the pin engaging the edge so as to move the cam plate in the second direction.

4. The magnetic tape recording/reproducing apparatus as claimed in claim 1, wherein the cam plate and drive cam plate are configured so that when the drive cam plate moves in the first direction the cam plate is engaged by the drive cam plate and moves unitarily with the drive cam plate.

* * * * *